(12) United States Patent
Chen et al.

(10) Patent No.: US 11,228,971 B2
(45) Date of Patent: Jan. 18, 2022

(54) CELL SELECTION BASED ON USER CAPABILITY

(71) Applicant: NEC CORPORATION, Tokyo (JP)

(72) Inventors: Yuhua Chen, London (GB); Alberto Suarez, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/649,848

(22) PCT Filed: Sep. 25, 2018

(86) PCT No.: PCT/JP2018/035414
§ 371 (c)(1),
(2) Date: Mar. 23, 2020

(87) PCT Pub. No.: WO2019/065618
PCT Pub. Date: Apr. 4, 2019

(65) Prior Publication Data
US 2020/0280913 A1 Sep. 3, 2020

(30) Foreign Application Priority Data
Sep. 29, 2017 (GB) ...................................... 1715921

(51) Int. Cl.
*H04W 48/20* (2009.01)
*H04W 48/12* (2009.01)
*H04W 84/04* (2009.01)

(52) U.S. Cl.
CPC .......... *H04W 48/20* (2013.01); *H04W 48/12* (2013.01); *H04W 84/042* (2013.01)

(58) Field of Classification Search
None
See application file for complete search history.

(56) References Cited

U.S. PATENT DOCUMENTS 10,979,967 B2\* 4/2021 Kim .................. H04W 72/0473
2009/0088160 A1 4/2009 Pani et al.
(Continued)

FOREIGN PATENT DOCUMENTS

CN 101682872 A 3/2010
CN 102547879 A 7/2012
(Continued)

OTHER PUBLICATIONS

Huawei et al., 3GPP TSG RAN WG1 Meeting NR#3, "Discussion on the PRACH for SUL", Sep. 18-21, 2017, 5 pages, R1-1715716.
(Continued)

*Primary Examiner* — Hong S Cho
(74) *Attorney, Agent, or Firm* — Sughrue Mion, PLLC (57) ABSTRACT

A cellular communication system is disclosed in which a base station operates a cell which has a supplementary uplink portion (e.g. on a different frequency and/or using a different technology). The base station broadcasts an offset for user equipment (UE) in its coverage area to assist the UE performing cell selection. Specifically, the UE determines; based on measurements for the cell, the offset, and capability of the UE to communicate using the supplementary uplink portion, whether the cell of the base station is an appropriate candidate for cell selection such that: if the UE is capable of communicating using the supplementary uplink portion then the UE performs cell (re)selection based on the offset; and if the UE is not capable of communicating using the supplementary uplink portion then the UE disregards the offset in its cell (re)selection.

15 Claims, 4 Drawing Sheets

(56) References Cited

U.S. PATENT DOCUMENTS

2017/0070931 A1 3/2017 Huang et al.
2020/0162211 A1* 5/2020 Wang .................... H04L 5/0037

FOREIGN PATENT DOCUMENTS

| | | |
|---|---|---|
| CN | 105007606 A | 10/2015 |
| EP | 3 136 782 A1 | 3/2017 |
| WO | 2014/179987 A1 | 11/2014 |
| WO | 2016/123247 A1 | 8/2016 |

OTHER PUBLICATIONS

3GPP TSG-RAN WG2 NR #101-Bis, "SUL Impact on Cell Selection and Reselection Criteria", InterDigital Inc, Apr. 16-20, 2018, 3pages, R2-1804813.

Huawei et al., "Initial access and uplink operations with SUL", 3GPP TSG RAN WGl Meeting #90, Aug. 21-25, 2017, 6 pages, R1-1712165.

Huawei et al., "Discussion on the UL power control for LTE-NR uplink coexistence", 3GPP TSG RAN WGl Meeting AH NR#3, Sep. 18-21, 2017, 5pages, R1-1715479.

"NGMN 5G White Paper", V1.0 by the Next Generation Mobile Networks (NGMN) Alliance, Feb. 17, 2015, 125pages.

3rd Generation Partnership Project; Technical Specification Group Services and System Aspects; Study on Architecture for Next Generation System (Release 14), 3GPP TR 23.799, V14.0.0, Dec. 2016, 552 pages.

United Kingdom Search Report for GB1715921.1 dated Feb. 28, 2018.

International Search Report for PCT/JP2018/035414 dated Dec. 5, 2018 [PCT/ISA/210].

Written Opinion for PCT/JP2018/035414 dated Dec. 5, 2018 [PCT/ISA/237].

Chinese Office Action for CN Application No. 201880062424.7 dated Jul. 5, 2021 with English Translation.

* cited by examiner

CELL SELECTION BASED ON USER CAPABILITY

CROSS REFERENCE TO RELATED APPLICATIONS

This application is a National Stage of International Application No. PCT/JP2018/035414 filed Sep. 25, 2018, claiming priority based on United Kingdom Patent Application No. 1715921.1 filed on Sep. 29, 2017, the disclosure of which is incorporated herein in its entirety by reference.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to uplink (UL) sharing between so called new radio (NR)/next generation (NG)/5G type communication equipment with long term evolution (LTE) type communication equipment, mechanisms for supporting provision and use of a supplementary uplink (SUL) carrier frequency.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'New Radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core (NGC) network.

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user (although it is also possible to connect so-called 'Internet of Things' devices and similar machine-type communication devices to the network). For simplicity, the present application will use the term base station to refer to any such base stations and use the term mobile device or UE to refer to any such communication device. The core network (e.g. the EPC in case of LTE or the NGC in case of NR/5G) hosts functionality for subscriber management, mobility management, charging, security, and call/session management (amongst others), and provides connection for communication devices to external networks, such as the Internet.

3GPP technical report (TR) 23.799 V14.0.0 describes a possible architecture and general procedures for NextGen (5G) systems planned for Release 14 of the 3GPP standards. 3GPP also studied the potential use of frequency bands up to 100 GHz for new (5G) radio access networks (employing NR radio technology), with a maximum channel bandwidth of 400 MHz per NR carrier in Rel-15. Directional beam-forming and massive antenna technologies may also be used in order to overcome the severe channel attenuation characteristics associated with certain high frequency bands (e.g. mmWave bands). The term 'massive antenna' refers to an antenna having a high number of antenna elements (e.g. 100 or more) arranged in an array. Effectively, such a massive antenna may be used to communicate with several users at the same time, thus facilitating multi-user multiple-input and multiple-output (MU-MIMO) transmissions. In case of MU-MIMO, a base station may also be referred to as a transmission and reception point (TRP).

It has been proposed that a UE may be configured with a plurality of uplink (UL) carriers on different frequencies where there is at least one LTE carrier of a first frequency and at least one NR carrier of a second, different, carrier frequency. In one supported example, the UE may be restricted to (at a given time) operate only on a single UL carrier of a given pair of carriers comprising an LTE carrier and an NR carrier. Nevertheless, simultaneous operation of a UE on two (or more UL carriers) is also supported.

Moreover, it has been proposed, that provision should be made for a supplementary uplink (SUL) frequency (e.g. over an LTE frequency) to support the case where there is only downlink resource for a carrier from an NR perspective (e.g. near the edge of an NR cell) or where it would be less optimal to use an NR frequency (e.g. when the UE is not capable of using the entire NR bandwidth or it does not need to do so).

3GPP intends to support the co-existence of LTE UL and NR UL (and the co-existence of LTE DL and NR DL) within the bandwidth of an LTE component carrier.

Accordingly, the applicable SUL frequency may be a frequency that is shared between LTE and NR (at least for the case when NR spectrum is below 6 GHz).

SUMMARY OF INVENTION

The present invention seeks to provide methods and associated apparatus that support or improve upon one or more of the above proposals/agreements in an efficient and effective manner.

Specifically, the inventors have realised that, based on the current assumptions, an asymmetry/imbalance is likely to arise between the respective coverages of NR downlink and NR uplink. In other words, due to the way downlink and uplink operate in NR, it is possible to serve a significantly larger area in the downlink than in the uplink (assuming all corresponding parameters are substantially the same). This may result in some UEs being able to receive DL communications from a particular base station but not being able to successfully transmit UL communications to that base station. Moreover, even if the UE is able to transmit to the base station using the NR UL resources, in some cases (at least for UEs that cannot use the entire NR bandwidth) UL resource utilisation may remain relatively poor.

Such asymmetry/imbalance may be illustrated, for example, in the case of Time Division Duplex (TDD) deployments for a 3.5 GHz NR band, where the following assumptions apply:
  massive MIMO is being used (having a typical configuration of 64T64R with 128/256 antenna elements);
  thanks to beam sweeping and/or other techniques (such as power boosting etc.) it is expected that all NR physical common and control channels in DL will match or exceed the coverage of the NR Physical Downlink Shared Channel (NR-PDSCH) at its maximum beamformed range;

UL/DL traffic asymmetry is expected to be heavily DL biased (e.g. 1:3 to 1:10);

in order to support such traffic asymmetry the UL/DL transmission times will also be highly asymmetric (e.g. at least 1:3); and UE power is much lower than DL power and fixed whereas DL power can also be scaled by the base station to the used bandwidth.

Based on the above, the assumed UL (e.g. NR Physical Uplink Shared Channel, 'NR-PUSCH') coverage may be 10 to 15 dB lower than that of DL (in TDD for a downlink oriented UL/DL frame configuration of 1:3 and a PUSCH/PDSCH data rate asymmetry of 1:10).

Thanks to beamforming the coverage of PDSCH at 3.5 GHz will be quite similar to the UL coverage in low Frequency Division Duplex (FDD) bands (e.g. an LTE band operating below 2000 MHz) depending on relative data rates considered.

Although such asymmetry/imbalance may be addressed by appropriate pairing of a 3.5 GHz carrier with a low FDD band (or SUL band), cell measurement and cell selection may still be problematic when SUL is in place.

In one example aspect, the invention provides a method performed by a user equipment (UE) in a cellular communication system, the method comprising: receiving cell selection information, from a base station, for use in selecting a cell operated by that base station, wherein the base station is configured to receive uplink (UL) communication on either a first carrier for UL and DL communication or a supplementary carrier for UL communication; performing measurements on signals transmitted on the first carrier; and determining, based on the measurements for the first carrier, the received cell selection information, and a capability of the UE to communicate using the supplementary carrier for UL communication, whether the cell of the base station is an appropriate candidate for cell (re)selection; wherein the cell selection information comprises: first cell selection information for use in determining, based on the measurements for the first carrier, whether the cell of the base station is an appropriate candidate for cell (re)selection when the UE is not capable of communicating using the supplementary carrier for UL communication; and second cell selection information for use in determining, based on the measurements for the first carrier, whether the cell of the base station is an appropriate candidate for cell (re)selection when the UE is capable of communicating using the supplementary carrier for UL communication.

In another example aspect, the invention provides a method performed by a user equipment (UE) in a cellular communication system, the method comprising: receiving, from a radio access network (RAN), measurement configuration for use in measurement of a cell operated by a base station of the RAN that is configured to receive uplink (UL) communication on either a first carrier for UL and DL communication or a supplementary carrier for UL communication; performing measurements on signals transmitted on the first carrier based on the received measurement configuration; and determining, based on the measurements for the first carrier and a capability of the UE to communicate using the supplementary carrier for UL communication, whether to report the results of said measurements to said RAN; wherein the measurement configuration comprises: a first measurement configuration for use in determining, based on the measurements for the first carrier, whether to report the results of said measurements to said RAN when the UE is not capable of communicating using the supplementary carrier for UL communication; and a second measurement configuration for use in determining, based on the measurements for the first carrier, whether to report the results of said measurements to said RAN when the UE is capable of communicating using the supplementary carrier for UL communication.

In one example aspect, the invention provides a method performed by a base station in a cellular communication system, the method comprising: transmitting cell selection information, to user equipment (UE), for use in selecting a cell operated by that base station, wherein the base station is configured to receive uplink (UL) communication on either a first carrier for UL and DL communication or a supplementary carrier for UL communication; wherein the cell selection information comprises: first cell selection information for use in determining, based on measurements for the first carrier, whether the cell of the base station is an appropriate candidate for cell (re)selection when the UE is not capable of communicating using the supplementary carrier for UL communication; and second cell selection information for use in determining, based on measurements for the first carrier, whether the cell of the base station is an appropriate candidate for cell (re)selection when the UE is capable of communicating using the supplementary carrier for UL communication.

In yet another example aspect, the invention provides a method performed by apparatus of a radio access network (RAN) in a cellular communication system, the method comprising: transmitting, to user equipment (UE), measurement configuration for use in measurement of a cell operated by a base station of the RAN that is configured to receive uplink (UL) communication on either a first carrier for UL and DL communication or a supplementary carrier for UL communication; and receiving results of measurements corresponding to the measurement configuration; wherein the measurement configuration comprises: a first measurement configuration for use in determining, based on measurements for the first carrier, whether to report the results of said measurements to said RAN apparatus when the UE is not capable of communicating using the supplementary carrier for UL communication; and a second measurement configuration for use in determining, based on measurements for the first carrier, whether to report the results of said measurements to said RAN apparatus when the UE is capable of communicating using the supplementary carrier for UL communication.

Example aspects of the invention extend to corresponding apparatus, system, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described by way of example only with reference to the attached figures in which.

DESCRIPTION OF EMBODIMENTS

Overview

Figure 1:
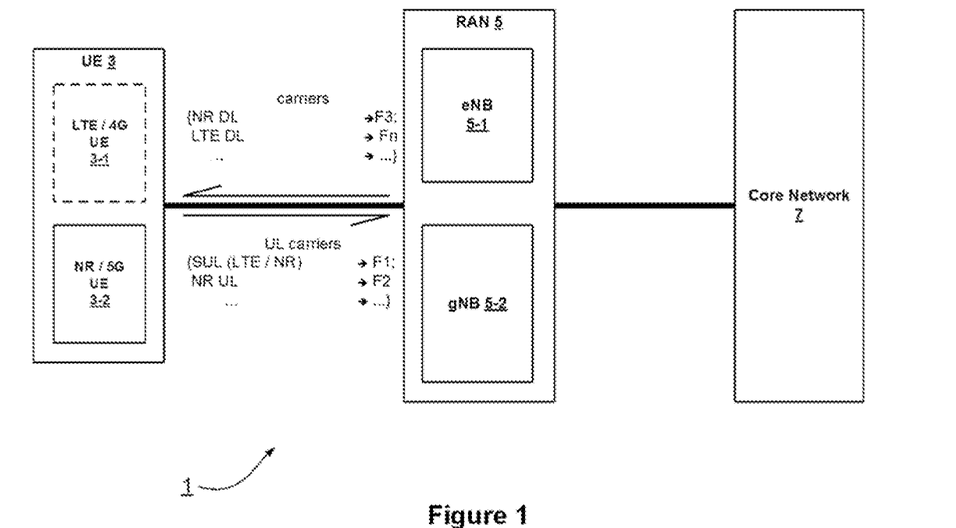
FIG. 1 is a simplified schematic illustration of a cellular telecommunication system of the type to which the present invention may be applied.

FIG. 1 schematically illustrates a telecommunication network 1 in which user equipment (UE) 3 (mobile telephones and/or other communication devices) can communicate with each other via radio access network (RAN) apparatus 5 which, in the illustrated example, comprises an LTE base station or 'eNB' 5-1, and NR/5G base station or 'gNB' 5-2, using an appropriate radio access technology (RAT). In this example, the UE 3 is capable of communicating as an LTE UE 3-1, which supports at least an LTE radio access technology, via the eNB 5 part of the RAN 5. The UE 3 is also capable of communicating as an NR/5G UE 3-2, which supports one or more 5G radio access technologies, via the gNB 5-2 part of the RAN 5. It will be appreciated, however, that the UE 3 need not have LTE capability and may only support the 5G capability. The UE 3 may be capable to perform carrier aggregation (CA) for combining the resources of more than one cell (including those of an LTE cell and an NR cell) for concurrent communication via the aggregated cells (or 'component carriers', as referred to in CA). CA may be used for increasing the bandwidth that can be allocated to a given UE 3, and in this case, for the provision of a supplementary uplink (SUL) resource via a different cell to the one being used for the downlink.

As those skilled in the art will appreciate, whilst one mobile device 3 (with three possible UE configurations) and one base station 5 are shown in FIG. 1 for illustration purposes, the system, when implemented, will typically include other base stations and mobile devices. For example, the LTE and NR cells may be provided via different respective base stations, if appropriate.

In this example, the eNB 5-1 and gNB 5-2 of the RAN are co-located with each base station operating one or more associated cells. UEs 3 connect to an appropriate cell (depending on their location and possibly on other factors, e.g. signal conditions, subscription data, capability, and/or the like) by establishing a radio resource control (RRC) connection with the base station 5-1, 5-2 operating that cell.

The RAN 5 is connected to a core network 7 via an appropriate interface. The core network 7 comprises the NR/5G functions required for supporting communication of the UE 3 via the gNB 5-2. The core network 7 includes, for example, functions for providing control plane management, user plane management, mobility management etc. . . . . The core network 7 also comprises partial or full EPC functionality for supporting communication of the UE 3 via the eNB 5-1.

The UE 3 and the RAN 5 are configured to use a plurality of carriers (or 'component carriers') for UE 3 to RAN 5 uplink (UL) communication and downlink (DL) communication RAN 5 to UE 3. These UL and DL carriers operate on a number of different carrier frequencies. The UL carriers include, in this example, a supplementary uplink (SUL) carrier on an SUL frequency (F1 in the illustrated example) and possibly at least one other frequency (e.g. a NR UL carrier on a corresponding UL frequency (F2, and possibly F3 if F3 is configured for both DL and UL communications) that is different to that of the SUL carrier). In this example the SUL carrier is on a frequency that is within the range used in LTE and can thus be shared between LTE and NR if appropriate (e.g. when the LTE UL and NR UL share UL subframes of the LTE frequency). It will be appreciated, however, that the SUL carrier may be a dedicated NR UL carrier and may operate in a frequency range that is not normally used for LTE, or the SUL carrier may be an LTE band/carrier that is used for NR UL dedicatedly. The UL carriers may also include other UL carriers (e.g. an LTE dedicated UL carrier on another frequency). The DL carriers, in this example, include at least one carrier for NR DL transmission on a frequency (F3) that is different to the uplink (UL) frequencies and at least one carrier for LTE DL transmission on a frequency (Fn) that is different to the NR DL frequency.

Figure 2:
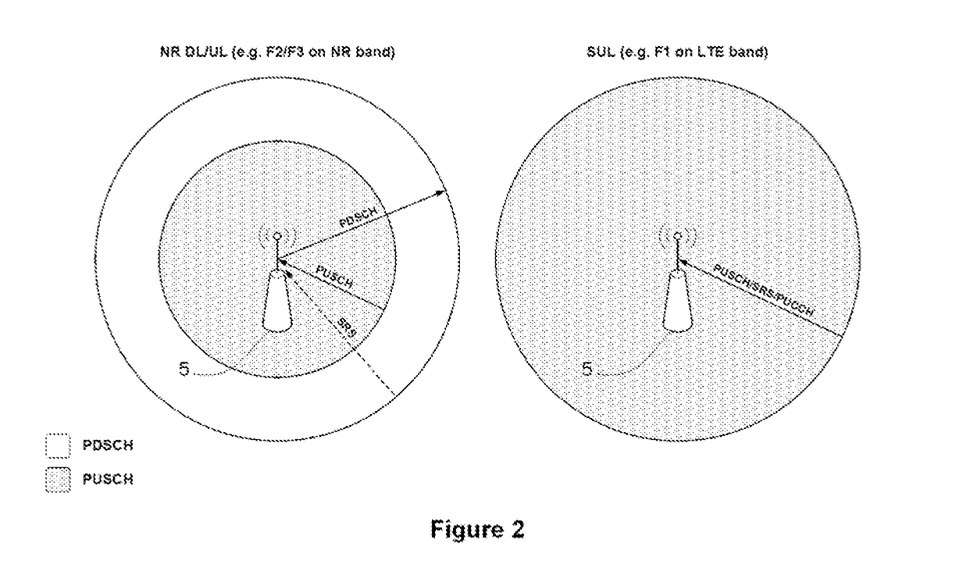
FIG. 2 is a simplified schematic illustration of supplementary uplink in the system shown in FIG. 1.

FIG. 2 illustrates an exemplary NR cell having a DL and an UL portion on a NR band/high frequency (left) and a SUL on an LTE band/low frequency (right). In this example, the SUL is operating with NR technology but on an LTE band, e.g. carrier F1. As illustrated in this figure, as a whole cell (both UL and DL), a cell with SUL has a larger coverage than a cell without SUL (i.e. when the left diagram is taken alone), because the NR coverage can only be used fully in the area that has both DL and UL coverage (the smaller, dotted area in the left). It will be appreciated that whilst the NR carriers and the SUL are shown in FIG. 2 separately, for illustration purposes, they are normally operated by the same base station apparatus (e.g. gNB 5-2).

In more detail, the coverage of the NR-PDSCH is about 10 to 15 dB higher than that of the NR-PUSCH (under the same or similar conditions). In a deployed system it means that the UE 3 may be able to receive the NR-PDSCH further away from the base station 5 than the maximum distance that still ensures successful uplink transmissions in the same cell from the UE 3 to the base station 5 via the NR-PUSCH. This is due to the above explained asymmetry/imbalance between the respective coverages of NR downlink and NR uplink (due to e.g. beamforming on the downlink and/or power scaling by the base station 5).

In this example, however, the SUL is provided via a different frequency (carrier), preferably one that can result in a better UL coverage for the UE 3 than the NR-PDSCH frequency (carrier). Specifically, a lower frequency band, e.g. LTE carrier F1, may be used for the provision of the SUL, which has a comparable coverage to that of the NR-PDSCH (e.g. they may be substantially identical). Therefore, as illustrated in the right hand side, the UE 3 is able to transmit its signals via the (NR-)PUSCH, (NR-)PUCCH, using the SUL.

It will be noted that FIG. 2 also illustrates the so-called Sounding Reference Signal (SRS) which is a reference signal transmitted by the UE 3 in the uplink direction. In this example, the SRS is transmitted via the SUL, albeit it may also be transmitted in the NR band. The SRS is used by the base station 5 to estimate the uplink channel quality over a wider bandwidth, and in some cases for uplink timing estimation as part of a timing alignment procedure for the UE 3 (e.g. when there are no PUSCH/PUCCH transmissions in the uplink).

Effectively, the base station 5 configures the UE 3 to use the downlink carrier (e.g. NR) and the SUL carrier (e.g. LTE) as component/complementary carriers and to communicate with the base station 5 using both carriers. In this example, therefore, UEs that support SUL may benefit from a relatively larger useful cell coverage (UL and DL combined) than UEs that do not support SUL. It will be appreciated that the provision of the SUL component of the NR cell is similar to carrier aggregation (CA) involving the carrier(s) of the NR cell and the band of the SUL as a component carrier.

It will be appreciated that such a SUL may be provided either as a stand-alone SUL for use by the NR radio access technology only (in which case the uplink resources of the SUL are not shared with LTE UEs). However, a SUL may also be provided as a shared SUL for use by both NR and LTE UEs. In the case of a shared SUL, there are two options:
the UE 3 is not configured with both SUL and LTE UL (at the same time); and
the UE 3 is configured with both LTE and SUL (in which case the SUL and LTE UL may share the same spectrum via TDM/FDM).

Turning now back to FIG. 1, the base station 5 is configured to facilitate initial cell access for UEs within its coverage area such that the UEs are able to benefit from using the SUL (and/or a potentially larger resulting coverage area).

In 3GPP systems, cell selection and initial cell access is facilitated by the base stations 5 broadcasting appropriate information (e.g. parameters to be used and/or UE measurements) for calculating their associated cell selection criterion 'S' based on which UEs 3 can evaluate whether or not to select a particular cell to camp on (e.g. when the UE 3 is operating in RRC idle or inactive mode). Similarly, such a cell selection criterion S may be used when selecting a suitable handover cell (e.g. a neighbour cell). The cell selection criterion S includes a set of sub-criteria comprising for example the 'Srxlev' sub-criteria that specifies a cell selection receiver (RX) level value (dB) and the 'Squal' sub-criteria that specifies a cell selection quality value (dB). The cell selection criterion S is fulfilled (for a given cell) when Srxlev>0, and Squal>0 (for that cell).

Beneficially, in this system, the UE 3 (assuming it is capable of SUL) is able to select an appropriate (NR) cell having a SUL component even if the cell selection criterion S for that cell is not fulfilled and thereby benefit from the relatively larger uplink coverage that may be attained via the SUL (than via the cell alone).

In more detail, the base station 5 is configured to transmit (broadcast) an appropriate cell selection criterion S for facilitating initial access for the UE 3 to the base station's cell(s) of the cell(s) of its neighbour(s). The cell selection criterion S in this case comprises an SUL related offset and SUL information (e.g. band, channel number, and/or the like) in the system information broadcast by the base station 5. Effectively, therefore, the UE 3 may be configured to relax the cell selection criterion S (by the amount indicated by the offset) and select a cell that would otherwise not meet the minimum cell selection criterion (as per the cell selection criterion 5, without an offset). In the example shown in FIG. 2, instead of the dotted area shown in the left hand diagram (representing the coverage of the gNB 5-2 where both UL and DL can be provided via its NR carrier, e.g. F2/F3), the UE 3 is beneficially able to select the cell within the larger dotted area shown in the right hand diagram (representing the coverage of the SUL, e.g. F1), and perform both UL and DL communications by combining (e.g. by carrier aggregation) the carriers (in this example F1+F3).

In other cases, the offset may be beneficially used to help the UE 3 select a cell that (whilst it met the minimum cell selection criterion but) would not have been selected as the strongest cell without considering the SUL related offset (i.e. the offset may be used to increase the likelihood of a particular cell being selected by the UE 3).

Beneficially, the offset may be applied by the UE 3 to one of the two sub-criteria of S (Srxlev or Squal) or to both of them, possibly with different numerical offsets for each.

Accordingly, the UE 3 is able to select an appropriate cell (e.g. for camping) by taking into account the effect of an SUL provided along with the selected cell. On the other hand, when no SUL is provided in a cell (or the UE 3 is not able to use that combination of SUL cell), the UE 3 is able to apply the cell selection criterion S in the normal manner, thereby preventing the UE 3 selecting a NR cell whilst outside of the PUSCH for that cell (even when within the coverage of the PDSCH).

In order to facilitate the UE 3 performing appropriate cell selection, by taking into account whether SUL is provided for a particular cell, the base stations of this system are configured to share with each other the applicable frequency configuration for their cells, including any associated SUL information and applicable SUL offset. Such information (neighbour SUL information) may be broadcast by each base station 5 in order to assist idle mode cell (re)selection by the UE 3. Moreover, when the base station 5 configures the UE 3 for cell measurements (as part of e.g. a connected mode mobility procedure), the base station 5 may also include in (or apply to) the measurement configuration any such neighbour SUL information (e.g. offset).

It will be appreciated that the (SUL) offset may comprise: a frequency specific offset (e.g. if all NR cells on that frequency pair with same/similar SUL); or a cell specific offset (e.g. otherwise).

It will be appreciated that the UE 3 may be configured to apply the SUL offset/information in its cell selection conditionally, for example, only if the UE 3 is SUL capable and support that particular carrier combination and/or the UE 3 mainly has downlink (or uplink) data and/or depending on a priority associated with the UE 3 and/or a service used by the UE 3.

User Equipment

Figure 3:
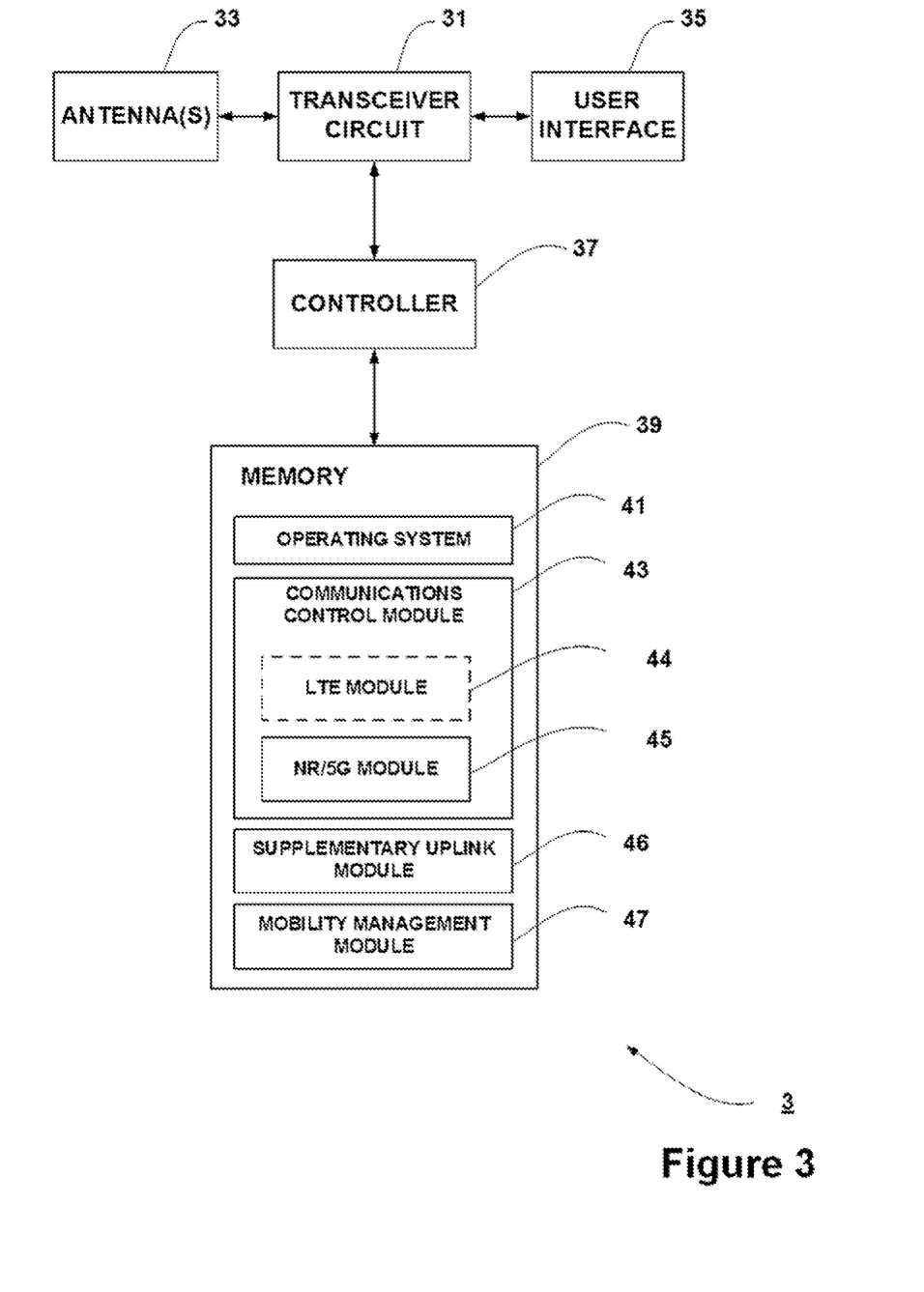
FIG. 3 is a simplified block diagram of user equipment which may form part of the system shown in FIG. 1.

FIG. 3 is a block diagram illustrating the main components of the UE 3 shown in FIG. 1 (e.g. a mobile telephone or other user equipment). As shown, the UE 3 has a transceiver circuit 31 that is operable to transmit signals to and to receive signals from a base station 5-1, 5-2 function of the RAN 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within memory 39. As shown, these software instructions include, among other things, an operating system 41, a communications control module 43 comprising a number of radio access technology modules (such as an LTE module 44 and a NR/5G module 45) to access compatible radio access networks, a supplementary uplink module 46, and a mobility management module 47.

The communications control module 43 is operable to control the communication between the UE 3 and a base station 5-1, 5-2 (and other communication devices connected to the base station 5-1, 5-2, such as further mobile devices and/or network nodes), The LTE module 44 is responsible for operating the UE as the LTE UE 3-1 and, in particular, for managing communication with the eNB 5-1 operating in accordance with current LTE standards (e.g. 3G/4G base station) and other nodes/devices connected to such a base station. The NR/5G module 45 is responsible for operating the UE as the NR/5G UE 3-2 and, in particular for managing communication with the gNB 5-2 operating in accordance with NextGen (5G) standards and other nodes/devices connected to such a NextGen base station.

The supplementary uplink module 46 is operable to control the UE 3 for configuring and communicating via an appropriate SUL. Such communication may include for example the generation, transmission and reception of messages using a PUSCH and/or a PUCCH (including NR-PUSCH/NR-PUCCH). As described in more detail elsewhere, the UE 3 may obtain using its supplementary uplink module 46 the necessary parameters for SUL (e.g. from system information/cell selection criterion S broadcast by the base station 5), including an offset associated with a particular cell for which SUL is enabled.

The mobility management module 47 is operable to control procedures (including measurement and reporting) relating to mobility of the UE 3 (such as cell selection). The mobility management module 47 is operable to take into account any SUL specific parameter (offset and/or other SUL information from the supplementary uplink module 46) when considering whether a particular cell can be selected.

RAN Apparatus (Base Station)

Figure 4:
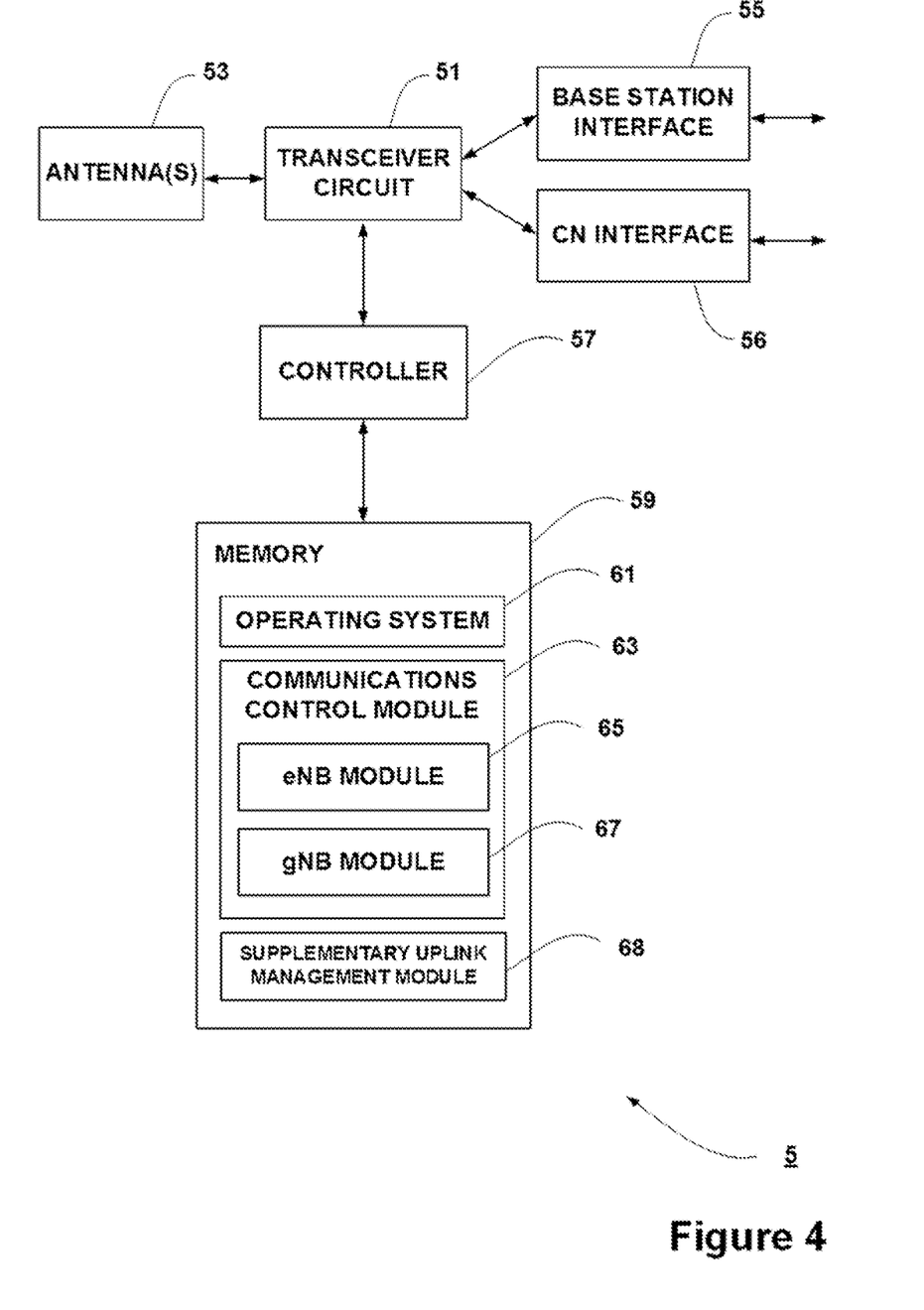
FIG. 4 is a simplified block diagram of a radio access network apparatus forming part of the system shown in FIG. 1.

FIG. 4 is a block diagram illustrating the main components of the RAN apparatus (base station 5) shown in FIG. 1. As shown, the RAN apparatus 5 has a transceiver circuit 51 for transmitting signals to and for receiving signals from the communication devices (such as UE 3) via one or more antenna 53, at least one base station interface 55 for transmitting signals to and for receiving signals from neighbouring base stations, and at least one core network interface 56 for transmitting signals to and for receiving signals from the core network 7.

The RAN apparatus 5 has a controller 57 to control the operation of the RAN apparatus 5. The controller 57 is associated with a memory 59. Although not necessarily shown in FIG. 4, the RAN apparatus 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the RAN apparatus 5 by, in this example, program instructions or software instructions stored within memory 59. As shown, these software instructions include, among other things, an operating system 61, a communications control module 63 comprising a number of base station modules (such as an eNB module 65 and a gNB module 67) to provide the functionality of a corresponding base station, and a supplementary uplink management module 68.

The communications control module 63 is operable to control the communication between the RAN apparatus 5 and the UE 3 (and other network entities that are connected to the RAN apparatus 5). The eNB module 65 is responsible for operating the RAN apparatus 5 as the eNB 5-1 and, in particular, for managing communication with the UE 3 when operating in accordance with current LTE standards (and/or with one or more LTE dedicated UEs). The gNB module 67 is responsible for operating the RAN apparatus 5 as the gNB 5-2 and, in particular for managing communication with the UE 3 when operating as an NR UE in accordance with NextGen (5G) standards (and/or with one or more NR dedicated UEs).

The supplementary uplink management module 68 is operable to control UEs 3 within the coverage area of the base station 5 for communications via an appropriate SUL (including cell selection and associated measurement configurations). For example, the supplementary uplink management module 68 may generate, transmit and receive messages using a PUSCH and/or a PUCCH (including NR-PUSCH/NR-PUCCH). When applicable, the supplementary uplink management module 68 may provide, to the UEs, SUL related offset and/or other information (for the base station's own and optionally for neighbouring cells) via system information broadcast.

In the above description, the UE 3 and the base station 5 are described for ease of understanding as having a number of discrete modules (such as the communications control modules and the SUL/SUL management modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation—Provision of a Supplementary Uplink (SUL)

Figure 5A:
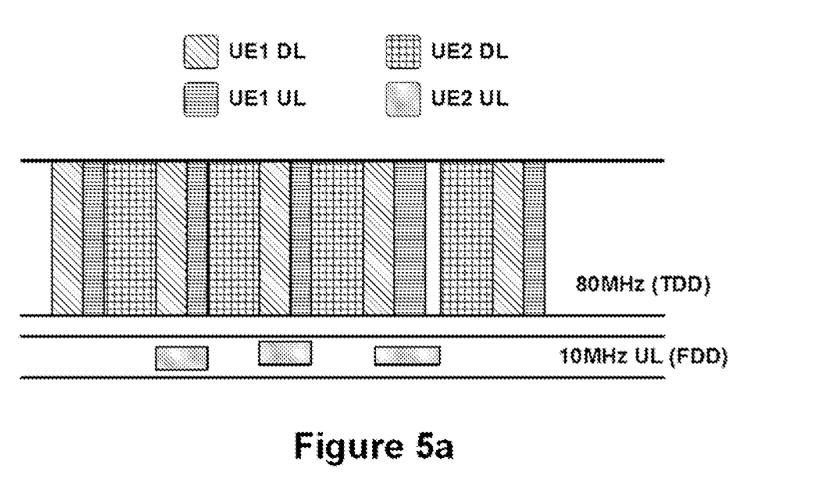
FIG. 5a is a simplified diagram of some of the exemplary ways in which a supplementary uplink carrier may be provided in the system of FIG. 1.

FIG. 5a illustrates an exemplary scenario in which a SUL is provided for user equipment in the base station's coverage area, along with an NR carrier (at least for DL). Specifically, in this example, an 80 MHz DL (or DL/UL) carrier is provided via an appropriate NR cell (in this case using TDD, although in other systems FDD may also be used). Some UEs (in this example the UE denoted 'UE1'), for example those that are located within the NR-PUSCH coverage of the base station 5 (the smaller dotted circle in FIG. 2), may be configured to use the NR carrier for both downlink and uplink communications.

However, some UEs (in this example the UE denoted 'UE2') may be configured to use the NR carrier for downlink communications (or both downlink and uplink communications) and use an appropriate SUL carrier for uplink communications. In this example, the SUL is provided via an additional 10 Mhz carrier (using a suitable FDD band) and compatible UEs may be configured to combine or aggregate (using CA) the SUL with the NR carrier when communicating with the base station 5.

Thanks to beamforming (and/or other techniques that may be used by a gNB 5-2) the coverage of the NR-PDSCH at 3.5 GHz may be quite similar to the UL coverage in a low FDD (e.g. LTE) band (depending on relative data rates and/or the like). Beneficially, therefore, the pairing of such a 3.5 GHz carrier with a low FDD band (SUL band) may result in an improved overall coverage for the base station 5.

Figure 5B:
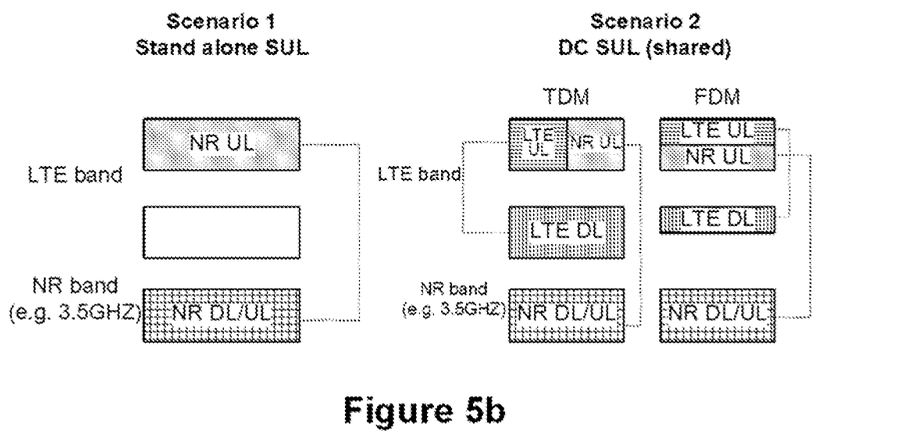
FIG. 5b is a simplified diagram of some of the exemplary ways in which a supplementary uplink carrier may be provided in the system of FIG. 1.

FIG. 5*b* illustrates (by way of dotted lines) some of the possible ways in which an NR carrier may be combined with an LTE carrier (or a different NR carrier, possibly on a lower band) in order to provide an appropriate SUL for the UE 3. In one option (denoted 'Scenario 1'), there is a stand-alone SUL that is used by the NR only. In another option, denoted 'Scenario 2' in FIG. 5*b*, the SUL may be shared by a plurality of radio access technologies (e.g. NR and LTE, either using TDM or FDM). This scenario may also be referred to as a shared or 'non-stand-alone' SUL, It will be appreciated, however, that any combination of the possibilities shown in FIG. 5*b* may also be possible within the same base station/RAN (for different UEs or groups of UEs).

Operation—Cell (Re)Selection when SUL is in Place

In the exemplary system shown in FIG. 1, when a stand-alone SUL is used, the base station 5 may be beneficially configured to transmit (broadcast) an appropriate cell selection criterion S for facilitating initial access for the UE 3 to the base station's cell(s). Specifically, the cell selection criterion S in this case comprises an SUL related offset and SUL information (e.g. band, Absolute Radio Frequency Channel Number (ARFCN)) in the system information broadcast by the base station 5. Effectively, therefore, the UE 3 may be configured to relax the cell selection criterion S (by the amount indicated by the offset) and select a cell (using its mobility management module 47) that would otherwise not meet the minimum cell selection criterion (as per the cell selection criterion S, without an offset).

Beneficially, the offset may be applied by the UE 3 to one of the two sub-criteria of S (Srxlev or Squal) or to both of them, possibly with different numerical offsets for each.

Upon receipt of the system information broadcast by the base station 5, when performing cell selection as part of a mobility procedure, the UE 3 is configured to perform (using its SUL module 46) one or more of the following actions:

- apply the offset (e.g. if the UE 3 is SUL capable and support that particular carrier combination);
- apply the offset/relaxed S if the UE 3 mainly only has downlink data; and
- apply the offset/relaxed S if the UE 3 has higher priority or a service used/requested by the UE 3 has higher priority service or the UE 3 uses a particular service.

Accordingly, the UE 3 is able to select (using its mobility management module 47) an appropriate cell for camping by taking into account the effect of an SUL provided along with the selected cell. On the other hand, when no SUL is provided in a cell (or the UE 3 is not able to use that combination of SUL cell), the UE 3 is able to apply the cell selection criterion S in the normal manner, thereby preventing the UE 3 selecting a NR cell whilst outside of the PUSCH for that cell (even when within the coverage of the PDSCH).

In the case of idle mode mobility (in stand-alone SUL scenario), the UE 3 and the base station 5 are configured to perform the following actions, as part of the UE's cell selection/reselection procedure:

- the base station 5 obtains (using its SUL management module 68) the frequency configuration applied by its neighbours (cells/base stations) including any associated SUL information and applicable offset for SUL (this may be performed for example via an operation and maintenance (OAM) or a neighbour information exchange procedure);
- the base station 5 broadcasts (in system information, using its communications control module 63) information related to its NR neighbour frequency(ies) and cell(s), including any offset for SUL and/or SUL frequency information;
- the UE 3 (e.g. after obtaining the necessary system information using its communications control module 43) applies the offset (using its SUL module 46) if there is a SUL in the candidate cell (and the UE 3 is SUL capable/capable of using that specific SUL); and
- the UE 3 may also need to read the system information of the measured (neighbour) cell in order to obtain the applicable SUL information for that cell.

It will be appreciated that there are three main options for the SUL configuration of the cells of a particular (neighbour) base station:

Case 1: all cells operating on a particular NR frequency (e.g. F3) have no associated SUL (or the SUL is disabled for at least some UEs);

Case 2: all cells have SUL on the same frequency (e.g. F1) (in this case the SUL related offset may be frequency specific); and Case 3: some cell(s) are operated with SUL and some cell(s) without SUL (in this case the SUL related offset may be cell specific).

In the case of connected mode mobility, there are at least two options (which may be applicable to both the stand-alone and the shared SUL scenario).

In a first option, similarly to the idle mode mobility case described above, the base station 5 obtains the frequency configuration applied by its neighbours any associated SUL information and applicable offset for SUL (Cases 1 to 3 above may apply).

For a RRC connected UE 3, the base station 5 is configured to send appropriate measurement configuration with one or more measurement object for a candidate NR frequency (e.g. F3, if SUL is provided on F1). For example, the measurement object of type 'B2' may be used for configuring appropriate measurements for a gNB addition (wherein measurement object B2 is defined by 3GPP as "PCell becomes worse than threshold1 and inter RAT neighbour becomes better than threshold2"), However, it will be appreciated that any suitable measurement object may be used.

Assuming that the base station 5 may not know whether or not the UE 3 has SUL capability, the base station 5 includes the appropriate SUL associated offset and SUL information in the measurement configuration/measurement object.

The UE 3 is configured to apply the SUL offset on the measurement result of the cell being measured (e.g. if the UE 3 is capable of using the indicated SUL while operating on the indicated measurement object, e.g. in this example NR carrier F3).

In a second option, for example, if the base station 5 knows whether or not the UE 3 has SUL capability, the base station 5 may include the appropriate SUL associated offset and SUL information in the measurement configuration/measurement object only if the UE 3 supports that SUL (otherwise the base station 5 may configure the measurements without the SUL offset/information). In other words, the base station 5 may be configured to take the coverage difference into account while configure the measurement/report event for the UE 3, i.e. merge the SUL offset into any other existing offset. In this case, therefore, the UE 3 does not need to consider whether or not to apply the offset/SUL information when considering that cell for selection (since the offset/SUL information were already applied by the base station 5).

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated, for example, that whilst the exemplary system describes a base station (RAN apparatus) in which the eNB and gNB are co-located and share a number of hardware and software modules, the eNB and gNB may be separate having their own dedicated hardware and software. The RAN apparatus may, in accordance with known 5G developments, have its functionality split between at least one distributed (or 'remote') unit (DU) which communicates with the UE, and a central unit (CU) between the DU and the core network. For example higher layer functionality may be provided by the CU while lower layer functionality may be provided by the DU.

It will be appreciated that the term 'component carrier' or 'carrier' as used in the description to refer to UL carriers and DL carriers, represents a distinct communication (or 'transmission') bandwidth within which individual time/frequency resources (e.g. physical resource blocks (PRBs)) may be scheduled. The term 'carrier' in this context should not be confused with the term 'sub-carrier', which represents the smallest unit of frequency used in a cellular communication system such as that described and which are typically allocated in groups (typically called PRBs) within a given communication time interval (e.g. a transmission time interval (TTI), mini-slot, slot, sub-frame or the like). Thus, a component carrier represents a transmission (UL, DL or both) bandwidth comprising a plurality (typically many tens) of PRBs, each of which comprises a plurality of (typically many, e.g. 12) sub-carriers.

In other words, the transmission bandwidth associated with each carrier typically comprises several hundred sub-carriers.

In the above example embodiments, the SUL is provided over a low LTE band. However, it will be appreciated that the SUL is effectively a NR carrier and hence it may use a NR radio access technology (although it may also use an LTE radio access technology, if appropriate). It will be appreciated that in some deployments the frequency band used by the SUL may be the same as the band used by the NR carriers.

In the above description of connected mode mobility, an inter-RAT measurement object is used as an example. However, it will be appreciated that—depending on the radio access technologies and frequency bands used by the different carriers—the measurement object may also comprise an intra-RAT measurement object or an intra-frequency measurement object.

The SUL is effectively a complementary part of a (NR) cell. Normally a cell consists of a DL and an UL carrier (for FDD, DL and UL are on different frequencies, whilst for TDD, DL and UL are different sub-frame sets on the same frequency). It will be appreciated that a cell with SUL may have a normal DL and UL portion and an additional SUL portion. In other words, the SUL may not necessarily be a stand-alone cell. The SUL may be provided by way of a specific cell configuration, in which case system information broadcast may be used to indicate (e.g. in DL system information) that a particular cell has a SUL portion.

The UE is configured to detect/measure the DL portion of the cell and, based on the measurement, decide whether it should select this cell or report this cell for potential HO decision. While the UE is connected to a cell with SUL, it may use either the SUL or the regular UL portion (or both) for its uplink transmissions.

It will be appreciated that when SUL is configured for a cell, the UE may perform cell selection/reselection/handover to that cell based on measurements for the DL part and apply an SUL specific offset (and/or the like) to the DL measurements.

In the above example embodiments, a number of software modules were described. As those skilled in the art will appreciate, the software modules may be provided in compiled or un-compiled form and may be supplied to the apparatus in question (UE, RAN, eNB, gNB etc.) as a signal over a computer network, or on a recording medium. Further, the functionality performed by part or all of this software may be performed using one or more dedicated hardware circuits. However, the use of software modules is preferred as it facilitates the updating of the base station or the mobile device in order to update their functionalities.

Each controller forming part of an apparatus described herein may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

The UE may receive the above mentioned information (information for use in selecting a cell operated by that base station, wherein the base station is configured to receive UL communication on either a first carrier for UL and DL communication or a supplementary carrier for UL communication) in a system information broadcast.

The first cell selection information may comprise at least one cell selection parameter for comparison with the measurements for the first carrier when the UE is not capable of communicating using the supplementary carrier for UL communication, and the second cell selection information may comprise at least one offset to be applied to the cell selection parameter for comparison with the measurements for the first carrier when the UE is capable of communicating using the supplementary carrier for UL communication.

The at least one offset may comprise a cell specific offset (e.g. dependent on the cell and/or the supplementary carrier) and/or a frequency specific offset.

The at least one cell selection parameter may comprise at least one of a received signal level value (e.g. 'Srxlev') and a signal quality value (e.g. 'Squal').

The method performed by the UE may further comprise, based on said determining, performing at least one of: camping on said cell: (re)selection of the cell: and addition of the cell to a set of serving cells (e.g. carrier aggregation).

The cell may comprise a new radio (NR) or 5G carrier (e.g. having an associated communication bandwidth that is not shared with a 4G carrier). In this case, the supplementary carrier may be a 4G or long term evolution (LTE) carrier for aggregation with a new radio (NR) or 5G carrier. The supplementary carrier may be shared among a plurality of user equipment and/or a plurality of cells.

The first carrier may be operated on a frequency band associated with a first radio access technology (e.g. a new radio (NR) or 5G radio access technology) and the supplementary carrier may be operated on a frequency band associated with a second radio access technology (e.g. a long term evolution (LTE) radio access technology). The first and second carriers may use the same radio access technology (regardless of the frequency band that they are operated on).

The above mentioned first measurement configuration may comprise information identifying at least one threshold for comparison with the measurements for the first carrier when the UE is not capable of communicating using the supplementary carrier for UL communication, and the second measurement configuration may comprise information identifying at least one offset to be applied to the at least one threshold for comparison with the measurements for the first carrier when the UE is capable of communicating using the supplementary carrier for UL communication. The method performed by the UE may further comprise receiving information identifying said offset from the base station.

The measurements for the first carrier may comprise at least one of a measurement of a received signal level value and a measurement of a signal quality value. The UE may receive at least said first measurement configuration in dedicated signalling (e.g. Radio Resource Control (RRC) signalling).

The measurement configuration information may comprise at least one of a measurement object (e.g. a 'B2' measurement object) for measuring an inter radio access technology (inter-RAT) neighbour cell, a measurement object for measuring an intra-RAT neighbour cell, and a measurement object for measuring an intra-frequency neighbour cell; and wherein the supplementary carrier comprises the neighbour cell.

The base station may obtain information for said second measurement configuration from a neighbouring base station and/or from an GAM entity. The RAN apparatus may comprise an NR or 5G base station (gNB) or an LTE base station (eNB).

Various other modifications will be apparent to those skilled in the art and will not be described in further detail here.

Some of or all the above-described example embodiments can be described as in the following Supplementary Notes, but are not limited to the following.

(Supplementary Note 1)

A method performed by a user equipment (UE) in a cellular communication system, the method comprising:
  receiving cell selection information, from a base station, for use in selecting a cell operated by that base station, wherein the base station is configured to receive uplink (UL) communication on either a first carrier for UL and DL communication or a supplementary carrier for UL communication;
  performing measurements on signals transmitted on the first carrier; and
  determining, based on the measurements for the first carrier, the received cell selection information, and a capability of the UE to communicate using the supplementary carrier for UL communication, whether the cell of the base station is an appropriate candidate for cell (re)selection;
wherein the cell selection information comprises:
  first cell selection information for use in determining, based on the measurements for the first carrier, whether the cell of the base station is an appropriate candidate for cell (re)selection when the UE is not capable of communicating using the supplementary carrier for UL communication; and
  second cell selection information for use in determining, based on the measurements for the first carrier, whether the cell of the base station is an appropriate candidate for cell (re)selection when the UE is capable of communicating using the supplementary carrier for UL communication.

(Supplementary Note 2)

The method according to Supplementary Note 1 comprising receiving said information in a system information broadcast.

(Supplementary Note 3)

The method according to Supplementary Note 1 or 2 wherein the first cell selection information comprises at least one cell selection parameter for comparison with the measurements for the first carrier when the UE is not capable of communicating using the supplementary carrier for UL communication, and the second cell selection information comprises at least one offset to be applied to the cell selection parameter for comparison with the measurements for the first carrier when the UE is capable of communicating using the supplementary carrier for UL communication.

(Supplementary Note 4)

The method according to Supplementary Note 3 wherein the at least one offset comprises a cell specific offset (e.g. dependent on the cell and/or the supplementary carrier) and/or a frequency specific offset.

(Supplementary Note 5)

The method according to Supplementary Note 3 or 4, wherein the at least one cell selection parameter comprises at least one of a received signal level value (e.g. 'Srxlev') and a signal quality value (e.g. 'Squal').

(Supplementary Note 6)

The method according to any of Supplementary Notes 1 to 5, further comprising, based on said determining, performing at least one of: camping on said cell; (re)selection of the cell; and addition of the cell to a set of serving cells (e.g. carrier aggregation).

(Supplementary Note 7)

The method according to any of Supplementary Notes 1 to 6, wherein the cell comprises a new radio (NR) or 5G carrier (e.g. having an associated communication bandwidth that is not shared with a 4G carrier)

(Supplementary Note 8)

The method according to Supplementary Note 7, wherein the supplementary carrier is a 4G or long term evolution (LIE) carrier for aggregation with a new radio (NR) or 5G carrier.

(Supplementary Note 9)

The method according to any of Supplementary Notes 1 to 8, wherein the supplementary carrier is shared among a plurality of user equipment and/or a plurality of cells.

(Supplementary Note 10)

The method according to any of Supplementary Notes 1 to 9, wherein the first carrier is operated on a frequency band associated with a first radio access technology (e.g. a new radio (NR) or 5G radio access technology) and the supplementary carrier is operated on a frequency hand associated with a second radio access technology (e.g. a long term evolution (LTE) radio access technology).

(Supplementary Note 11)

A method performed by a user equipment (UE) in a cellular communication system, the method comprising:
  receiving, from a radio access network (RAN), measurement configuration for use in measurement of a cell operated by a base station of the RAN that is configured to receive uplink (UL) communication on either a first carrier for UL and DL communication or a supplementary carrier for UL communication;

performing measurements on signals transmitted on the first carrier based on the received measurement configuration; and determining, based on the measurements for the first carrier and a capability of the UE to communicate using the supplementary carrier for UL communication, whether to report the results of said measurements to said RAN;

wherein the measurement configuration comprises:
  a first measurement configuration for use in determining, based on the measurements for the first carrier, whether to report the results of said measurements to said RAN when the UE is not capable of communicating using the supplementary carrier for UL communication; and
  a second measurement configuration for use in determining, based on the measurements for the first carrier, whether to report the results of said measurements to said RAN when the UE is capable of communicating using the supplementary carrier for UL communication.

(Supplementary Note 12)

The method according to Supplementary Note 11, wherein the first measurement configuration comprises information identifying at least one threshold for comparison with the measurements for the first carrier when the UE is not capable of communicating using the supplementary carrier for UL communication, and the second measurement configuration comprises information identifying at least one offset to be applied to the at least one threshold for comparison with the measurements for the first carrier when the UE is capable of communicating using the supplementary carrier for UL communication.

(Supplementary Note 13)

The method according to Supplementary Note 12, further comprising receiving information identifying said offset from said base station.

(Supplementary Note 14)

The method according to any of Supplementary Notes 11 to 13, wherein the measurements for the first carrier comprise at least one of a measurement of a received signal level value and a measurement of a signal quality value.

(Supplementary Note 15)

The method according to any of Supplementary Notes 11 to 14, comprising receiving at least said first measurement configuration in dedicated signalling (e.g. Radio Resource Control (RRC) signalling).

(Supplementary Note 16)

The method according to any of Supplementary Notes 11 to 15, wherein said measurement configuration information comprises at least one of a measurement object (e.g. a 'B2' measurement object) for measuring an inter radio access technology (inter-RAT) neighbour cell, a measurement object for measuring an intra-RAT neighbour cell, and a measurement object for measuring an intra-frequency neighbour cell; and wherein the supplementary carrier comprises the neighbour cell.

(Supplementary Note 17)

A method performed by a base station in a cellular communication system, the method comprising:

transmitting cell selection information, to user equipment (UE), for use in selecting a cell operated by that base station, wherein the base station is configured to receive uplink (UL) communication on either a first carrier for UL and DL communication or a supplementary carrier for UL communication;

wherein the cell selection information comprises:
  first cell selection information for use in determining, based on measurements for the first carrier, whether the cell of the base station is an appropriate candidate for cell (re)selection when the UE is not capable of communicating using the supplementary carrier for UL communication; and
  second cell selection information for use in determining, based on measurements for the first carrier, whether the cell of the base station is an appropriate candidate for cell (re)selection when the UE is capable of communicating using the supplementary carrier for UL communication.

(Supplementary Note 18)

A method performed by apparatus of a radio access network (RAN) in a cellular communication system, the method comprising:

transmitting, to user equipment (UE), measurement configuration for use in measurement of a cell operated by a base station of the RAN that is configured to receive uplink (UL) communication on either a first carrier for UL and DL communication or a supplementary carrier for UL communication; and receiving results of measurements corresponding to the measurement configuration;

wherein the measurement configuration comprises:
  a first measurement configuration for use in determining, based on measurements for the first carrier, whether to report the results of said measurements to said RAN apparatus when the UE is not capable of communicating using the supplementary carrier for UL communication; and
  a second measurement configuration for use in determining, based on measurements for the first carrier, whether to report the results of said measurements to said RAN apparatus when the UE is capable of communicating using the supplementary carrier for UL communication.

(Supplementary Note 19)

The method according to Supplementary Note 18 comprising obtaining information for said second measurement configuration from a neighbouring base station and/or an operations and maintenance (OAM) entity.

(Supplementary Note 20)

The method according to any of Supplementary Notes 11 to 19, wherein the RAN apparatus comprises a new radio (NR) or 5G base station (gNB).

(Supplementary Note 21)

The method according to any of Supplementary Notes 11 to 20, wherein the RAN apparatus comprises a long term evolution (LTE) base station (eNB), (Supplementary Note 22)

A user equipment (UE) for a cellular communication system, the UE comprising:

a transceiver and a controller;

wherein the transceiver is configured to receive cell selection information, from a base station, for use in selecting a cell operated by that base station, wherein the base station is configured to receive uplink (UL) communication on either a first carrier for UL and DL communication or a supplementary carrier for UL communication;

wherein the controller is configured to perform measurements on signals transmitted on the first carrier, and determine, based on the measurements for the first carrier, the received cell selection information, and a capability of the UE to communicate using the supplementary carrier for UL communication, whether the cell of the base station is an appropriate candidate for cell (re)selection;

wherein the cell selection information comprises:

first cell selection information for use in determining, based on the measurements for the first carrier, whether the cell of the base station is an appropriate candidate for cell (re)selection when the UE is not capable of communicating using the supplementary carrier for UL communication; and second cell selection information for use in determining, based on the measurements for the first carrier, whether the cell of the base station is an appropriate candidate for cell (re)selection when the UE is capable of communicating using the supplementary carrier for UL communication.

(Supplementary Note 23)

A user equipment (UE) for a cellular communication system, the UE comprising:

a transceiver and a controller;

wherein the transceiver is configured to receive, from a radio access network (RAN), measurement configuration for use in measurement of a cell operated by a base station of the RAN that is configured to receive uplink (UL) communication on either a first carrier for UL and DL communication or a supplementary carrier for UL communication;

wherein the controller is configured to perform measurements on signals transmitted on the first carrier based on the received measurement configuration, and determine, based on the measurements for the first carrier and a capability of the UE to communicate using the supplementary carrier for UL communication, whether to report the results of said measurements to said RAN;

wherein the measurement configuration comprises:

a first measurement configuration for use in determining, based on the measurements for the first carrier, whether to report the results of said measurements to said RAN when the UE is not capable of communicating using the supplementary carrier for UL communication; and a second measurement configuration for use in determining, based on the measurements for the first carrier, whether to report the results of said measurements to said RAN when the UE is capable of communicating using the supplementary carrier for UL communication.

(Supplementary Note 24)

A base station for a cellular communication system, the apparatus comprising:

a transceiver and a controller wherein the controller is configured to:

transmit cell selection information, to user equipment (UE), for use in selecting a cell operated by that base station, wherein the base station is configured to receive uplink (UL) communication on either a first carrier for UL and DL communication or a supplementary carrier for UL communication;

wherein the cell selection information comprises:

first cell selection information for use in determining, based on measurements for the first carrier, whether the cell of the base station is an appropriate candidate for cell (re)selection when the UE is not capable of communicating using the supplementary carrier for UL communication; and second cell selection information for use in determining, based on measurements for the first carrier, whether the cell of the base station is an appropriate candidate for cell (re)selection when the UE is capable of communicating using the supplementary carrier for UL communication.

(Supplementary Note 25)

Apparatus of a radio access network (RAN) for a cellular communication system, the apparatus comprising:

a transceiver and a controller wherein the transceiver is configured to: transmit, to user equipment (UE), measurement configuration for use in measurement of a cell operated by a base station of the RAN that is configured to receive uplink (UL) communication on either a first carrier for UL and DL communication or a supplementary carrier for UL communication; and receive results of measurements corresponding to the measurement configuration;

wherein the measurement configuration comprises:

a first measurement configuration for use in determining, based on measurements for the first carrier, whether to report the results of said measurements to said RAN apparatus when the UE is not capable of communicating using the supplementary carrier for UL communication; and a second measurement configuration for use in determining, based on measurements for the first carrier, whether to report the results of said measurements to said RAN apparatus when the UE is capable of communicating using the supplementary carrier for UL communication.

(Supplementary Note 26)

A cellular communication system, the apparatus comprising at least one base station according to Supplementary Note 24 or at least one apparatus according to Supplementary Note 25, and at least one user equipment according to Supplementary Note 22 or 23.

(Supplementary Note 27)

A computer implementable instructions product comprising computer implementable instructions for causing a programmable device to become configured as the base station according to Supplementary Note 24 or the apparatus according to Supplementary Note 25 or as the user equipment according to Supplementary Note 22 or 23.

The invention claimed is:

1. A method performed by a user equipment (UE) in a communication system, the method comprising:

receiving cell selection information, from a base station, for use in selecting a cell of the communication system, wherein the UE is configured to transmit uplink (UL) communication on either a first carrier for UL and DL communication or a supplementary UL carrier;

performing measurements on signals received in the cell; and determining whether at least one cell selection criterion for the cell has been fulfilled, based on: a result of said measurements; and a parameter obtained from the received cell selection information;

wherein the parameter is obtained from either:

first cell selection information when the UE supports the use of the supplementary UL carrier in the cell; or second cell selection information, different to the first cell selection information, when the UE does not support the use of the supplementary UL carrier in the cell.

2. The method according to claim 1 comprising receiving said cell selection information in a system information broadcast.

3. The method according to claim 1 wherein the first cell selection information comprises at least one cell selection parameter for comparison with the result of said measurements when the UE supports the use of the supplementary UL carrier in the cell, and the second cell selection information comprises at least one different cell selection parameter for comparison with the result of said measurements when the UE does not support the use of the supplementary UL carrier in the cell.

4. The method according to claim 3 wherein the at least one cell selection parameter comprises a cell specific cell selection parameter.

5. The method according to claim 3, wherein the at least one cell selection parameter comprises a minimum required received signal level value.

6. The method according to claim 1, further comprising, based on said determining, performing at least one of: camping on said cell; selection or reselection of the cell; and addition of the cell to a set of serving cells.

7. The method according to claim 1, wherein the cell comprises a new radio (NR) or 5G carrier.

8. The method according to claim 7, wherein the supplementary carrier is a 4G or long term evolution (LTE) carrier for aggregation with a new radio (NR) or 5G carrier.

9. The method according to claim 1, wherein the supplementary UL carrier is shared among a plurality of user equipment or a plurality of cells.

10. The method according to claim 1, wherein the first carrier is operated on a frequency band associated with a first radio access technology and the supplementary carrier is operated on a frequency band associated with a second radio access technology.

11. A method performed by a base station in a communication system, the method comprising:
transmitting cell selection information, to user equipment (UE), for use in selecting a cell of the communication system, wherein the base station is configured to receive uplink (UL) communication on either a first carrier for UL and DL communication or a supplementary UL carrier;
wherein the cell selection information is configurable to comprise either:
first cell selection information for use in determining, when the UE supports the use of the supplementary UL carrier in the cell, whether at least one cell selection criterion for the cell has been fulfilled, based on a result of measurements on signals received by the UE in the cell; or
second cell selection information for use in determining, when the UE does not support the use of the supplementary UL carrier in the cell, whether at least one cell selection criterion for the cell has been fulfilled, based on the result of said measurements on signals received by the UE in the cell.

12. A user equipment (UE) for a communication system, the UE comprising:
a transceiver and a controller;
wherein the transceiver is configured to receive cell selection information, from a base station, for use in selecting a cell of the communication system, wherein the UE is configured to transmit uplink (UL) communication on either a first carrier for UL and DL communication or a supplementary UL carrier;
wherein the controller is configured to perform measurements on signals received in the cell, and determine whether at least one cell selection criterion for the cell has been fulfilled, based on: a result of said measurements; and a parameter obtained from the received cell selection information;
wherein the parameter is obtained from either:
first cell selection information when the UE supports the use of the supplementary UL carrier in the cell; or
second cell selection information, different to the first cell selection information, when the UE does not support the use of the supplementary UL carrier in the cell.

13. A base station for a communication system, the base station comprising:
a transceiver and a controller wherein the controller is configured to:
transmit cell selection information, to user equipment (UE), for use in selecting a cell of the communication system, wherein the base station is configured to receive uplink (UL) communication on either a first carrier for UL and DL communication or a supplementary UL carrier;
wherein the cell selection information is configurable to comprise either:
first cell selection information for use in determining, when the UE supports the use of the supplementary UL carrier in the cell, whether at least one cell selection criterion for the cell has been fulfilled, based on a result of measurements on signals received by the UE in the cell; or
second cell selection information for use in determining, when the UE does not support the use of the supplementary UL carrier in the cell, whether at least one cell selection criterion for the cell has been fulfilled, based on the result of said measurements on signals received by the UE in the cell.

14. A communication system comprising the base station according to claim 13 and at least one user equipment (UE); wherein the at least one UE comprises:
a transceiver; and
a controller,
wherein the transceiver is configured to receive the cell selection information, from the base station, for use in the selecting the cell of the communication system,
wherein the UE is configured to transmit the UL communication on either the first carrier for the UL and the DL communication or the supplementary UL carrier,
wherein the controller is configured to perform measurements on signals received in the cell, and determine whether at least one cell selection criterion for the cell has been fulfilled, based on:
a result of said measurements, and
a parameter obtained from the received cell selection information,
wherein the parameter is obtained from either:
the first cell selection information when the UE supports the use of the supplementary UL carrier in the cell, or
the second cell selection information, different to the first cell selection information, when the UE does not support the use of the supplementary UL carrier in the cell.

15. A non-transitory computer readable medium comprising computer implementable instructions that are executable by a programmable device to perform a method as claimed in claim 1.

* * * * *